United States Patent [19]

Adell

[11] 4,259,812

[45] Apr. 7, 1981

[54] EDGE MOLDING FOR VEHICLE DOORS

[75] Inventor: Robert Adell, Bloomfield Hills, Mich.

[73] Assignee: U.S. Product Development Company, Novi, Mich.

[21] Appl. No.: 21,084

[22] Filed: Mar. 16, 1979

Related U.S. Application Data

[63] Continuation of Ser. No. 863,998, Dec. 23, 1977, abandoned.

[51] Int. Cl.³ .............................................. B60J 5/00
[52] U.S. Cl. ...................................... 49/462; 52/716; 52/823
[58] Field of Search ........................ 52/716, 823, 400; 49/462

[56] References Cited

U.S. PATENT DOCUMENTS

| 2,704,687 | 3/1955 | Adell | 49/462 |
| 2,704,688 | 3/1955 | Adell | 49/462 |
| 2,856,229 | 10/1958 | Adell | 49/462 |
| 3,214,212 | 10/1965 | Horton | 52/400 X |
| 3,340,224 | 9/1967 | Sherman et al. | 52/400 |
| 3,401,486 | 9/1968 | Adell | 49/462 |
| 3,545,157 | 12/1970 | Cziptschirsch et al. | 49/462 |

Primary Examiner—Alfred C. Perham

[57] ABSTRACT

An ornamental and protective molding for the edges of vehicle doors in which a U-shaped metal strip is lined with a nonmetallic material so that the lining strip facilitates insulation of the molding and acts as an insulator and seal to prevent rusting and corrosion.

2 Claims, 4 Drawing Figures

U.S. Patent    Apr. 7, 1981    4,259,812
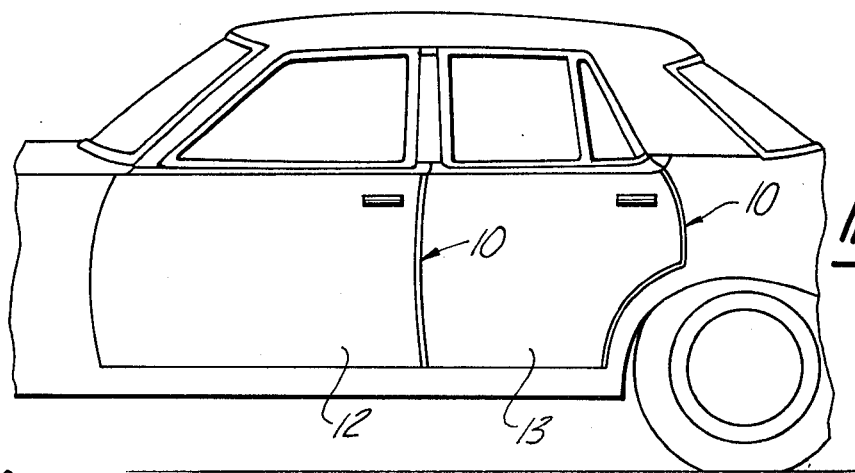
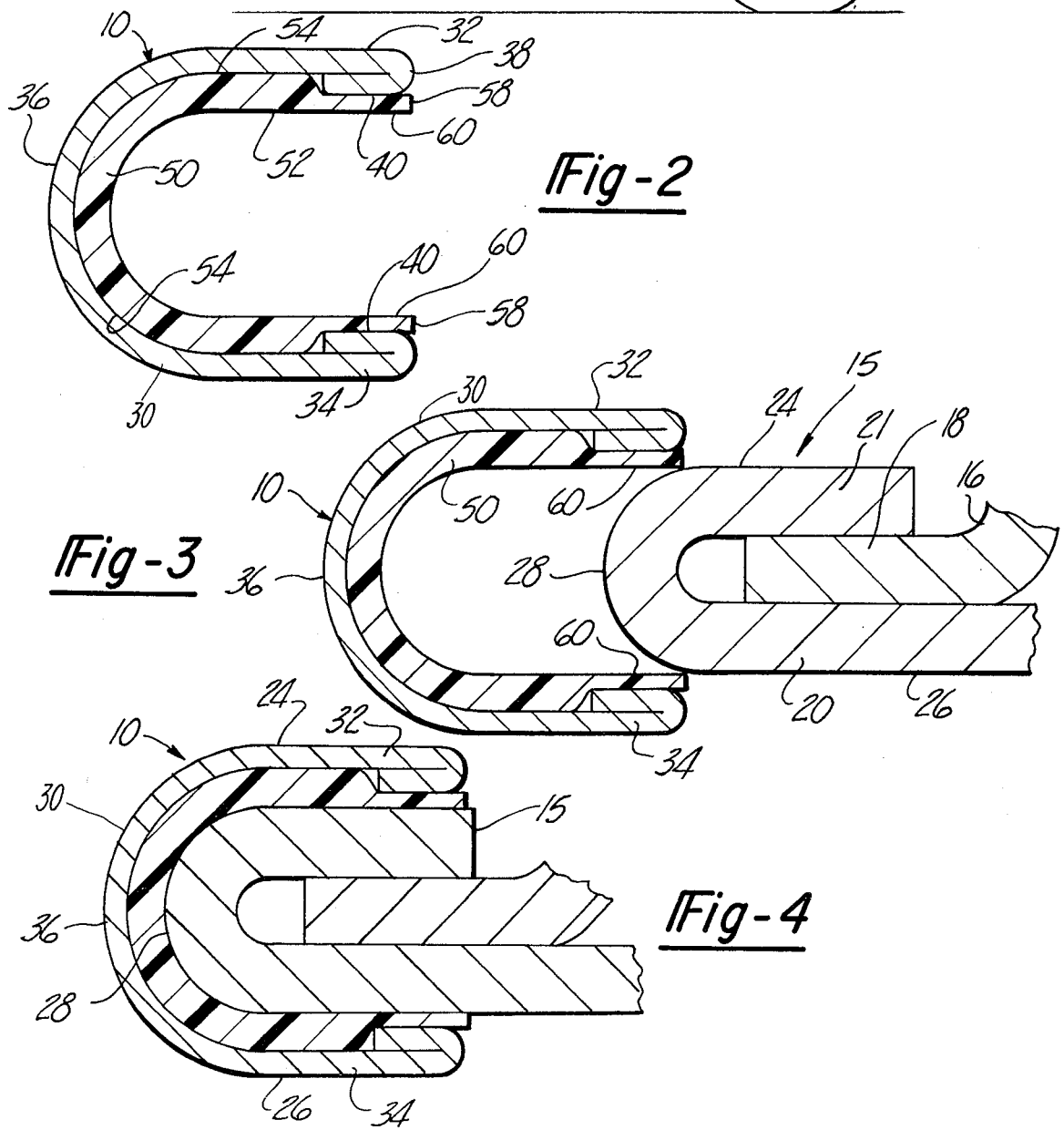

EDGE MOLDING FOR VEHICLE DOORS

This is a continuation of application Ser. No. 863,998, filed Dec. 23, 1977, and now abandoned.

This invention relates to moldings for use on automotive vehicles or the like and more particularly to ornamental and protective moldings to be mounted on the edges of vehicle doors.

Strips of molding are applied to the marginal edges of vehicle doors for ornamental and protective purposes. Typically such moldings are made of metal and are U-shaped in cross section to rely on the resiliency of the molding to grip opposed surfaces at the hem or marginal edge of the door. The edges of the door are thin when compared with the balance of the door and usually include a layer of metal folded around the edge of another layer of metal so that three layers of material result. A plastic sealant material is applied between the layers of metal which is subsequently dried and hardened. Also the outer surfaces are painted. As a result, the various layers of metal, sealant and paint making up the marginal edge of the door result in a non-uniform door edge having relatively wide variations in dimensions. It is on this door edge that it is customary to install ornamental and protective moldings. In making such an installation it is necessary to use a molding which can accommodate all of the dimensional variances. To do so the molding must have an opening not much smaller than the smallest thickness of the door edge. Thereafter, when the molding is applied to the edge of the door, it is forced into position and in so doing the molding may be distorted excessively so that it loses some of its ability to be retained in position. Also forcing the molding into position may cause scratching of the paint, particularly at high spots or thick portions of the door edge. Such scratches can encourage the formation of rust and initiate corrosion which are conditions that can become particularly aggravated in the presence of moisture. When the metals used in the door and in the trim molding are dissimilar, electro-chemical reactions can occur which accelerate corrosion.

It is highly desirable and is an object of the invention to provide a molding for the edges of doors which can accommodate wide variations in door thickness and can be applied to the door without scratching the surfaces.

Another object of the invention is to provide a molding for door edges wherein the molding grips opposed surfaces of the door to hold the molding in position.

A further object of the invention is to provide a molding for door edges wherein the material forming the decorative exterior of the molding is insulated from the material forming the door.

Still another object of the invention is to provide a molding for doors wherein the molding not only grips the door but also exerts pressure on a resilient seal member to seal moisture from the edges of the door.

The objects of this invention are accomplished by providing a molding for the edges of vehicle doors in which the molding is in the form of an elongated strip of relatively hard material such as metal having a generally U-shaped cross section with the inner walls of the U-shaped strip having a complementary strip of lining material which is softer than the exterior strip. The exterior strip of relatively hard material has bead portions at opposite edges of the opening formed by the legs of the U which act as the primary points applying pressure to opposed surfaces of the door to hold the trim molding in position. The lining strip of material can be relatively thin in the areas abutting the beaded edges and substantially thicker in the remaining areas to substantially fill the void between the outer surfaces of the marginal edge of the door and the interior of the U-shaped strip of hard material forming the decorative outer portion of the molding.

These and other objects of the invention will become apparent from the following description and from the drawings in which:

FIG. 1 is a fragmentary elevational view of a motor vehicle showing ornamental and protective molding embodying the present invention applied at the trailing edge of each of the vehicle doors;

FIG. 2 is a transverse cross sectional view of the molding at an enlarged scale and separate from the vehicle;

FIG. 3 is a view similar to FIG. 2 showing the molding in position for installation on the edge of a vehicle door; and FIG. 4 is a view similar to FIG. 3 showing the molding in its fully applied position to the door edge.

The ornamental and protective molding embodying the present invention is designated generally at 10 and is shown applied to the trailing edges of doors 12 and 13 of an automotive vehicle. The door edge 15 to which the molding is applied includes an inner door sheet 16 made of metal and bent to provide a flange 18 and an outer door sheet 20 having an edge portion 21 bent and folded around the flange 18 to form a marginal door edge having an oppositely facing inboard surface 24 and outboard surface 26 with the extreme edge 28 being curved.

During the formation of the door, a sealant material is applied between the various layers of metal making up the door and subsequently portion 21 is spot welded to flange 18. Thereafter the door is painted and the paint and sealant are dried to a hardened condition. Because of the multiple layers and particularly because of the layers of sealant and paint which are very variable in thickness, the total thickness of the door edge 15 can vary substantially over the full length of the trailing edge on which the molding 10 is to be applied. In actual practice on some models of automotive vehicles, doors constructed in this manner actually vary in dimension from a thickness of 0.110 to 0.160 inches and the molding 10 which is applied to these edges must accommodate these substantial variations.

The molding 10 includes a strip 30 of resilient metal such as stainless steel, for example, which is bent to form a channel having a generally U-shaped cross section with an inner leg 32 and an outer leg 34 disposed substantially parallel to each other and joined together by a bight portion 36. The free ends of the legs 32 and 34 are formed by bending the edges of the strip of metal upon itself and results in beaded edges having facing surfaces 40 spaced slightly from the door surfaces 24 and 26 in the asembled condition of the molding and door. Disposed within the channel shaped strip 30 is another channel shaped strip 50 made of relatively softer material. In the illustrated embodment the strip 50 is molded of plastic in a generally U-shaped configuration with the inner surface 52 conforming generally to the inner surface 24, outer surface 26 and edge 28 of the doors 12 and 13. The outer surface 54 of the plastic U-shaped member is shaped to be complementary to the inner surface of the metal member 30. In particular, the edges 58 formed adjacent to beads 38 are relatively thin while the remainder of the body member has a substantially heavier cross section. In the assembled condition of the metal strip 30 and plastic strip 50, the beads 38 serve to hold the plastic strip 50 in position. If desired, however, a layer of adhesive may be used between the strip 30 and lining 50. In order to accommodate dimensional variations in the door edge 15, the spacing between the facing surfaces 60 is maintained slightly smaller than the minimum door dimension that is expected to be encountered.

When the molding strip is to be applied to the edge 15 of a door, the parts are placed relative to each other as best seen in FIG. 3 so that the gap between the surfaces 60 receives the rounded edge 28 of the door edge 15. Subsequently the molding is forced onto the door edge 15 during which time the rlatively soft lining material forming the U-shaped portion 50 and more particularly the surfaces 60, engage the outer surfaces 24 and 26 of the door edge so that the molding 30 does not scratch or mar the paint on the door. The molding 30 is forced into position until the U-shaped plastic member 50 engages the edge 28. This limits further movement of the molding onto the door lip 15 and cushions the relatively hard portion 30 from the hard surfaces of the door.

In the position seen in FIG. 4, the surfaces 60 engage opposed and oppositely facing surfaces 24 and 26 of the door edge 15 and the resilient material of the outer strip 30 acts to clamp the molding 10 into position. At the same time, the pressure applied by the beads 38 on the plastic surfaces 60 acts as a seal to seal out dirt and moisture which otherwise might enter between adjoining surfaces of the door molding 10 and the doors 12 and 13. The strip 50 is made of a electrically non-conductive plastic material to insulate the metal strip 30 used in molding assembly 10 from the metal used in the edge of the door 15. In some instances when the door and moldings are made of dissimilar materials such as aluminum and steel the insulation can be very significant in preventing electrolysis between the unlike metals which can result in corrosion.

Preferably the molding 10 is made so that the opposed surfaces 60 are spaced apart a distance slightly less than the smallest dimension of the door edge 15 which is expected to be encountered. With door edges of the type previously mentioned ranging in thickness from 0.110 to 0.160 inches it would be highly desirable that the gap between the edges 58 be slightly less than 0.110 inches. The thckness of the plastic portions adjacent to the beads 38 is very thin when compared with the remainder of the plastic body. By way of example, with the edges having a thickness of 0.005 inches, the remainder of the U-shaped plastic portion can have a thickness of approximately 0.020 inches to substantially fill the space between the metal U-shaped member 30 and the outer surfaces of the door edge 15. Not only does the plastic liner in the molding assembly protect the door surfaces during installation of the molding but once the molding is placed in position as shown in FIG. 3, it forms a generally flexible seal against moisture to resist rusting and an insulator between metal layers to resist corrosion. Also the plastic strip 50 absorbs shock loads which may be imposed on the exterior metal skin when the edge of the door is struck against obstacles during opening.

Although it is preferred that the lining 50 be made of relatively firm, extruded plastic material, it is contemplated that the lining may be made of other materials such as soft plastic foam, gasket or other like materials. Such materials are available in commercial form as tapes with adhesive on one or both sides. In the latter case the tapes are available in rolls with a layer of paper to separate the adhesive on the top and the bottom of the tape. The interior of the U-shaped metal strip 30 may be lined with such material with adhesive on the one side of the tape holding the lining in position relative to the metal strip 30 and leaving the paper layer in position for removal just prior to installing the strip on a vehicle. If the tape type material used has a single layer of adhesive, the adhesive is used to hold the lining in position within the strip 30. Alternatively the strip can be placed in position on the vehicle door prior to installation of the metal strip 30 and in the assembled condition on the door edge 15 such an installation achieves many of the advantages of the embodiments shown in FIGS. 2, 3 and 4. When the lining material 50 is in the form of foam it tends to be compressed at the beads 38 and the remainder of the material remains fully or partially expanded to occupy the space between the metal strip 30 and the surfaces of the door edge 15.

An ornamental and protective molding for the edges of vehicle doors has been provided in which an elongated strip of relatively hard material such as metal is formed in a U-shaped cross section and a second strip of relatively soft material such as plastic and also having a U-shaped cross section is disposed on the interior surfaces of the metal U-shaped portion with the plastic U-shaped portion forming an elongated opening to receive a door edge. The opposite facing surfaces of the door edge are engaged by the lining portion which is pressed into engagemnt with the door edges by the metal portion to form a seal and insulation protecting the edge of the door from rusting and corrosion as well as holding the molding in attached position on vehicle doors.

The embodiments of the invention in which an exclusive property or privilege is claimed are defined as follows:

1. In a vehicle body having a sheet metal closure, such as a door, on a marginal edge portion of which is disposed an ornamental and protective edge molding formed from a metallic strip into a generally U-shaped cross section comprising an inner leg and an outer leg and a bead formed at the free end of each leg by folding back the corresponding free edge of the strip interiorly of the U to provide a bead surface facing the opposite leg, the improvement characterized in that: a non-metallic strip softer than the metal of the edge molding and of generally U-shaped cross section and having inner and outer legs corresponding to the legs of the edge molding is disposed within the interior of the edge molding to insulate the edge molding from contact with the closure edge portion; the free end of each leg of said non-metallic strip covers the corresponding bead surface; and said beads, via said bead surfaces, press the free ends of the legs of said non-metallic strip against the closure edge portion to retain the edge molding and the non-metallic strip on the closure edge portion with the non-metallic strip providing a seal between the closure edge portion and the interior of the edge molding.

2. In an ornamental and protective edge molding adapted to be applied to a marginal edge portion of a sheet metal vehicle body closure, such as a door, said edge molding being formed from a metallic strip into a generally U-shaped cross section comprising an inner leg and an outer leg and comprising a bead formed at the free end of each leg by folding back the corresponding free edge of the strip interiorly of the U to provide a bead surface facing the opposite leg, the improvement characterized in that: a non-metallic strip softer than the metal of the edge molding and of generally U-shaped cross section and having inner and outer legs corresponding to the legs of the edge molding is disposed within the interior of the edge molding for insulating the edge molding from contact with a sheet metal closure when the edge molding is installed thereon; and the free end of each leg of said non-metallic strip covers the corresponding bead surface so that when the edge molding is installed on a sheet metal closure, the free end of each leg of said non-metallic strip will be disposed between the corresponding bead surface and the closure to be pressed by the corresponding bead via its said bead surface against the closure edge portion thereby retaining the edge molding and the non-metallic strip on the closure edge portion with the non-metallic strip thereby adapted to provide a seal between the closure edge portion and the interior of the edge molding.

* * * * *